United States Patent
Dutta et al.

(10) Patent No.: US 8,971,291 B2
(45) Date of Patent: *Mar. 3, 2015

(54) P-CSCF FAST HANDOFF FOR IMS/MMS ARCHITECTURE

(75) Inventors: Ashutosh Dutta, Bridgewater, NJ (US); Abhrajit Ghosh, Edison, NJ (US); Subir Das, Kendall Park, NJ (US); Dana Chee, Maplewood, NJ (US); Kyriakos Manousakis, New Brunswick, NJ (US); Funchun Joseph Lin, Morris Plains, NJ (US); Shih-wei Li, Germantown, MD (US); Tsunehiko Chiba, Saitama (JP); Hidetoshi Yokota, Minuma (JP); Akira Idoue, Toda (JP)

(73) Assignees: Telcordia Technologies, Inc., Piscataway, NJ (US); KDDI Corporation, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 13/323,317

(22) Filed: Dec. 12, 2011

(65) Prior Publication Data

US 2012/0082136 A1    Apr. 5, 2012

Related U.S. Application Data

(63) Continuation of application No. 11/900,450, filed on Sep. 11, 2007, now Pat. No. 8,098,627.

(51) Int. Cl.
H04W 4/00 (2009.01)
(52) U.S. Cl.
USPC .......................................... 370/331; 370/332

(58) Field of Classification Search
CPC ................... H04W 36/0016; H04W 36/0022; H04W 36/0033; H04W 36/0038
See application file for complete search history.

(56) References Cited

U.S. PATENT DOCUMENTS

| 6,788,676 | B2 | 9/2004 | Partanen et al. |
| 6,910,106 | B2 | 6/2005 | Sechrest et al. |
| 7,551,585 | B2 | 6/2009 | Foti et al. |
| 7,706,779 | B2 | 4/2010 | Buckley |
| 8,311,021 | B2 * | 11/2012 | Saifullah et al. ............... 370/338 |
| 8,391,873 | B2 * | 3/2013 | Deshpande et al. ........... 455/445 |
| 2004/0103282 | A1 | 5/2004 | Meier et al. |
| 2005/0163078 | A1 | 7/2005 | Oba et al. |

(Continued)

FOREIGN PATENT DOCUMENTS

| EP | 1 662 726 A1 | 5/2006 |
| WO | 2005/039132 | 4/2005 |

OTHER PUBLICATIONS

International Search Report, dated Apr. 2, 2008 (2 pages).

(Continued)

*Primary Examiner* — Phirin Sam

(57) ABSTRACT

A mechanism by which handoff delay can be minimized while not compromising the IMS/MMD security and also protecting the media if required by certain applications is presented. One proactive method includes proactive authentication. Another proactive method includes proactive security association, such as transferring SA keys from old proxy to new proxy, or transferring keys through serving signal entities. Reactive methods include transferring SA keys from old proxy to new proxy, using either push or pull technology. Other reactive methods include transferring keys through serving signal entities using either push or pull technology.

5 Claims, 16 Drawing Sheets

(56) References Cited

U.S. PATENT DOCUMENTS

| | | | |
|---|---|---|---|
| 2006/0018280 A1* | 1/2006 | Kumar et al. | 370/331 |
| 2006/0078120 A1 | 4/2006 | Mahendran | |
| 2006/0120287 A1* | 6/2006 | Foti et al. | 370/231 |
| 2006/0187858 A1* | 8/2006 | Kenichi et al. | 370/254 |
| 2006/0252438 A1* | 11/2006 | Ansamaa et al. | 455/503 |
| 2006/0274693 A1* | 12/2006 | Nikander et al. | 370/331 |
| 2006/0291483 A1* | 12/2006 | Sela | 370/401 |
| 2007/0060097 A1* | 3/2007 | Edge et al. | 455/404.1 |
| 2007/0110009 A1* | 5/2007 | Bachmann et al. | 370/338 |
| 2007/0189218 A1* | 8/2007 | Oba et al. | 370/331 |
| 2007/0189255 A1* | 8/2007 | Navali et al. | 370/338 |
| 2007/0206539 A1 | 9/2007 | Yegani et al. | |
| 2007/0211694 A1 | 9/2007 | Rasanen | |
| 2007/0253371 A1* | 11/2007 | Harper et al. | 370/331 |
| 2007/0254661 A1* | 11/2007 | Chowdhury et al. | 455/436 |
| 2008/0049648 A1 | 2/2008 | Liu et al. | |
| 2008/0095070 A1 | 4/2008 | Chan et al. | |
| 2008/0137541 A1* | 6/2008 | Agarwal et al. | 370/241 |
| 2008/0225793 A1* | 9/2008 | Wang et al. | 370/331 |
| 2010/0115272 A1* | 5/2010 | Batta | 713/162 |
| 2010/0165947 A1* | 7/2010 | Taniuchi et al. | 370/331 |

OTHER PUBLICATIONS

M. Barton, D. Atkins, J. Lee, S. Narain, D. Ritcherson, K. Tepe, K. Wong, "Integration of IP Mobility and Security for Secure Wireless Communications" ICC 2002, IEEE International Conference on Communications, 2002, vol. 2, pp. 1045-1049.

N. Nakajima, A. Dutta, S. Das, H. Schulzrinne, "Handoff Delay Analysis and Measurement for SIP Based Mobility in IPv6," ICC 2003, IEEE International Conference on Communications, May 11-15, 2003, vol. 2, pp. 1085-1089.

Choi et al. Seamless Handoff Scheme Based on Pre-registration and Pre-authentication for UMTS-WLAN Interworking. Wireless Personal Communications, Kluwer Academic Publishers, DO, val. 41, No. 3, Aug. 23, 2006, pp. 345-364, XP019509774.

Kim L Ynggaard Larsen et al. Optimized Macro Mobility within the 3GPP IP Multimedia Subsystem. Computing in the Global Information Technology, 2006. ICCGI 2006. International Multi-Conference on Bucharest, Romania Aug. 1-3, 2006, Piscataway, NJ, USA, IEEE, Jul. 1, 2006, pp. 82-82, XP031056650.

\* cited by examiner

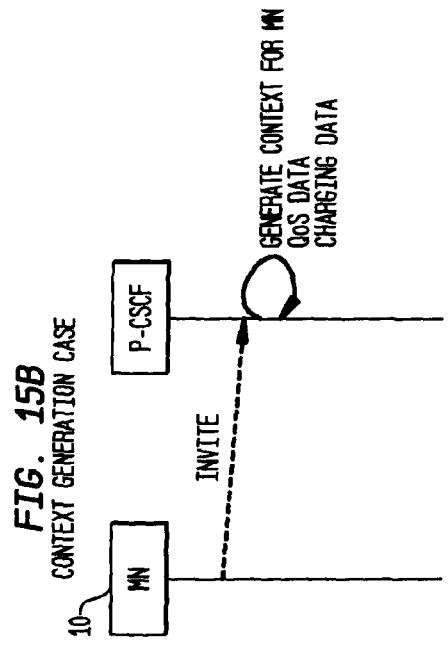
FIG. 15A
BOOTSTRAPPING CASE
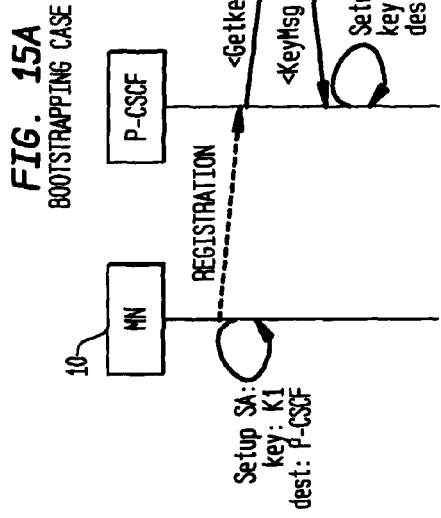
FIG. 15B
CONTEXT GENERATION CASE
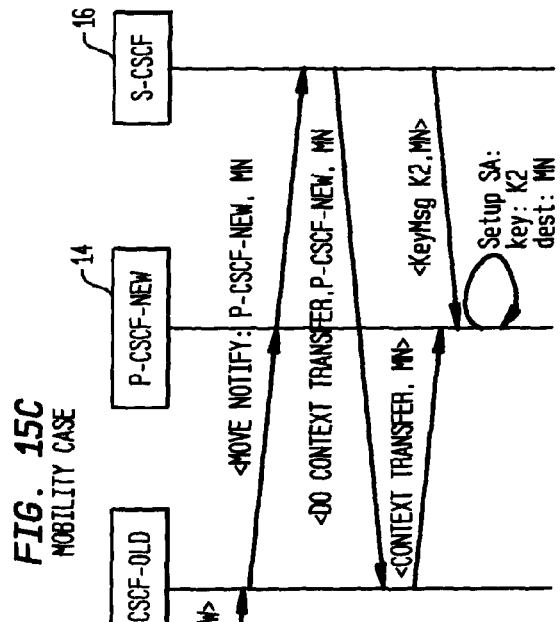
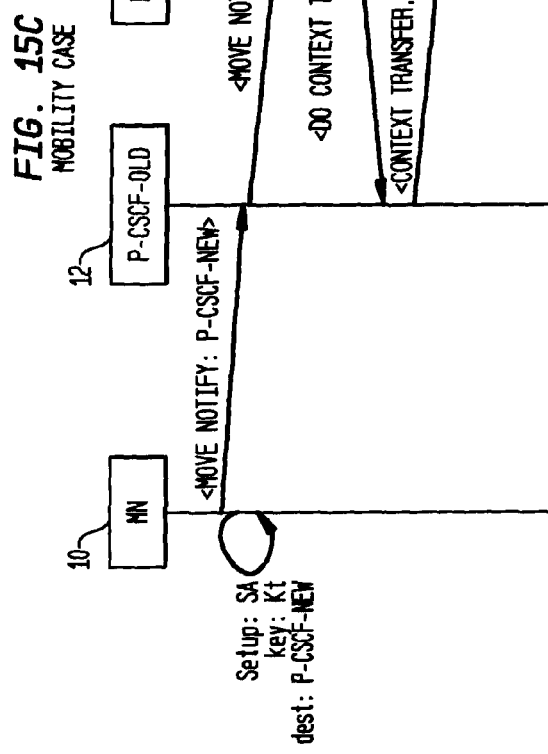
FIG. 15C
MOBILITY CASE

P-CSCF FAST HANDOFF FOR IMS/MMS ARCHITECTURE

CROSS REFERENCE TO RELATED APPLICATION

This application is a continuation of pending U.S. patent application Ser. No. 11/900,450, filed Sep. 11, 2007. The present invention claims the benefit of U.S. provisional patent application 60/843,676 filed Sep.11, 2006, the entire contents and disclosure of which are incorporated herein by reference.

FIELD OF THE INVENTION

The present invention relates generally to IMS/MMD architecture, and more specifically to proxy signaling entity fast handoff in IMS/MMD networks.

BACKGROUND OF THE INVENTION

An IMS/MMD (Multimedia Domain) network or architecture primarily consists of several signaling entities such as proxy-call session control function (P-CSCF), interrogating-CSCF (I-CSCF), serving-CSCF (S-CSCF), and home subscriber service (HSS) which is usually a database or other repository for user or subscriber information such as authorization data, including information related to services provided to a user. Roaming service and mobility are supported by a combination of Session Initiation Protocol (SIP) components such as the signaling entities, P-CSCF, S-CSCF, I-CSCF, and mobile IP components or nodes, such as home agent (HA) and foreign agent (FA). IMS/MMD architecture mandates that there should be security association (SA) between the mobile and P-CSCF. Secure Internet Protocol (IPSec) is one way of providing SA for signaling and media traffic.

In the MMD, service is not provided until an SA is established between the user equipment (UE) and the network. Typically, UE is a Mobile Node (MN). IMS is essentially an overlay to the packet data subsystem (PDS) and has a low dependency on the PDS as it can be deployed without the multimedia session capability. Consequently, a separate SA is required between the multimedia client and the IMS before access is granted to multimedia services.

The primary focus of the IMS/MMD security architecture is the protection of SIP signaling between the subscriber and the IMS. The IMS defines a means of mutual authentication between the subscriber and the IMS, and also specifies mechanisms for securing inter- and intra-domain communication between IMS network elements.

In an IMS/MMD environment, P-CSCF is the first entry point in a visited network as far as SIP signaling is concerned. A P-CSCF has multiple roles in the network as defined by IMS/MMD standard. Primarily it acts like the first hop outbound proxy for the mobile. Any SIP related messages (e.g., REGISTER, INVITE etc.) have to traverse via this P-CSCF. Although these are supposed to behave as proxies, they are call-stateful proxies, and thus each P-CSCF is equipped with client daemon and server daemon and is capable of generating any non-INVITE messages. Thus during handoff, P-CSCF plays an important role both for signaling and media. Media cannot traverse through a new packet data servicing node (PDSN) in the visited network during handoff until a new SA between P-CSCF and MN has been established. Thus it is essential to have all security states transferred from old P-CSCF to new P-CSCF before any new media passes through the new PDSN for security optimization. For an IMS/MMD architecture, where all P-CSCFs are in the visited network, this has even more significance in terms of local quality of service (QoS) and pricing information. Since P-CSCF maintains such information, until these parameters are properly transferred from the old-P-CSCF to new P-CSCF, the handoff will not be fast. In order to have a seamless handover for a real time session between two visited networks, fast P-CSCF transition is essential, and is commonly known as P-CSCF fast handoff.

How the signaling and media will be affected if there is no fast P-CSCF handoff mechanism in place is described. After that, the fast handoff mechanisms both for proactive and reactive handovers are discussed and details regarding how the signaling and media delay during handover can be minimized are presented.

FIG. 1 gives the details call flow during handoff when P-CSCF fast handoff is absent. In this scenario, normal SIP registration with authentication and key agreement (AKA) happens with the new P-CSCF.

Unless the registration is successful, the gate at the new PDSN will not be open and thereby will not allow any packet from Mobile Node to traverse through the new visited network, except MIP binding update and SIP registration signaling. This is primarily because no SA exists between MN and new P-CSCF. Thus, there can be a substantial delay depending upon the load at the new P-CSCF and the time required to establish an IPSec SA between Mobile Node and new P-CSCF. A boxed portion of FIG. 1 indicates the period whereby the session will be interrupted for signaling, except SIP registration and MIP binding update, since no other signaling messages can be exchanged during this time, e.g., auxiliary signaling such as paging, IM etc. Once the gate at new PDSN is open, MN can send and receive other signaling along with the media.

Similarly, FIG. 2 shows the media delay during handoff without fast P-CSCF handoff mechanism in place. The media delay is significant since MN cannot send any packet unless the gate at the new PDSN is open during the registration process although MIP update is performed earlier. Also, there can be a substantial increase to the delay value depending upon the P-CSCF load, HA load and the distance between HA and MN. This delay can range from several hundred milliseconds to seconds in some cases. Thus for delay sensitive real time applications, delay is an issue.

BRIEF SUMMARY OF THE INVENTION

The present invention advantageously provides methods for mitigating such delay issues and providing some alternative mechanisms that may be used if media security is also required in certain applications.

The following abbreviations are used throughout.
AKA: authentication and key agreement
CDR: call data record
CH: correspondent host
CoA: care-of Address
CXTP: context transfer protocol
FA: foreign agent
HA: home agent
HSS: home subscriber service
IMS: IP Multimedia Subsystem
IMS/MMD: combination of IMS and MMD
IPSec: suite of security protocols
MIPv4: Mobile IPv4
MIPv6: Mobile IPv6
MMD: Multimedia Domain
MN: mobile node MPA: Media independent Pre-Authentication
PCRF: policy control rules function
P-CSCF: Proxy Call Session Control Function
PDG: packet data gateway
PDIF: packet data interworking function
DS: packet data subsystem
PDSN: Packet Data Serving Node
QoS: Quality of Service
SA: security association
S-CSCF: Serving Call Session Control Function
SIP: session initiation protocol
TCP: transmission control protocol
UDP: user datagram protocol
UE: user equipment

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 15a illustrates Flow Diagram for Implementation of a Bootstrapping Case;

FIG. 15b illustrates Flow Diagram for Implementation of a Context Generation Case;

FIG. 15c illustrates Flow Diagram for Implementation of a Mobility Case; and,

DETAILED DESCRIPTION OF THE INVENTION

Fast handoff can be achieved by two well-known concepts: i) Proactive Handover and ii) Reactive Handover. By definition, proactive handover means both network and Mobile Node prepare themselves for handover a-priori before connecting to a new access link, i.e., layers 1 and 2. On the other hand, reactive handover refers to handover preparation as and when Mobile Node connects to a new access link. While handover can be initiated by both network and Mobile Node, only network controlled Mobile Node assisted fast handoff mechanisms are described. These same techniques could be applied to mobile controlled networks as well.

As discussed above, proactive handover means handover preparation for a new link occur while the mobile is still connected to an existing link. There are several components that constitute the delay, both media dependent and media independent, during handover and the goal of this handover technique is to minimize such delays and associated packet loss. In addition to network assisted handover control, a media independent mechanism known as MPA (Media independent Pre-Authentication), and minimizing the handoff delay using this mechanism, is described, along with techniques using pre-registration to establish AKA ahead of time.

Proactive authentication including MPA assisted handoff belongs to the proactive handoff category. In this scenario, illustrated in FIGS. 3 and 4, the mobile discovers the new network 22 and the associated elements through a discovery mechanism. Such discovery mechanisms are known in the art. Once either the mobile determines that it is about to handover, or the network directs the mobile to handover, the mobile pre-authenticates via the proxy, generally P-CSCF 14, in the new network 22 and performs a pre-registration with S-CSCF 16. As part of pre-registration, AKA procedure is also performed and a new security association is established. As soon as the security association is established, the context state transfer takes place between previous or old P-CSCF 12 and new P-CSCF 14. After the security association is established and the context transfer is done between the P-CSCFs, the gate for media opens up. In case of IPv6, pre-configuration also takes place. However, in case of MIPv4 with FA-COA, Mobile Node 10 does not change its own address. In this MPA security association, context transfer and MIP binding update takes place ahead of the physical transfer, so that the only delay experienced is the delay due to layer 2 handoff.

Below the call flows for both MIPv4 and MIPv6 case using MPA type mechanism are shown.

Figure 1:
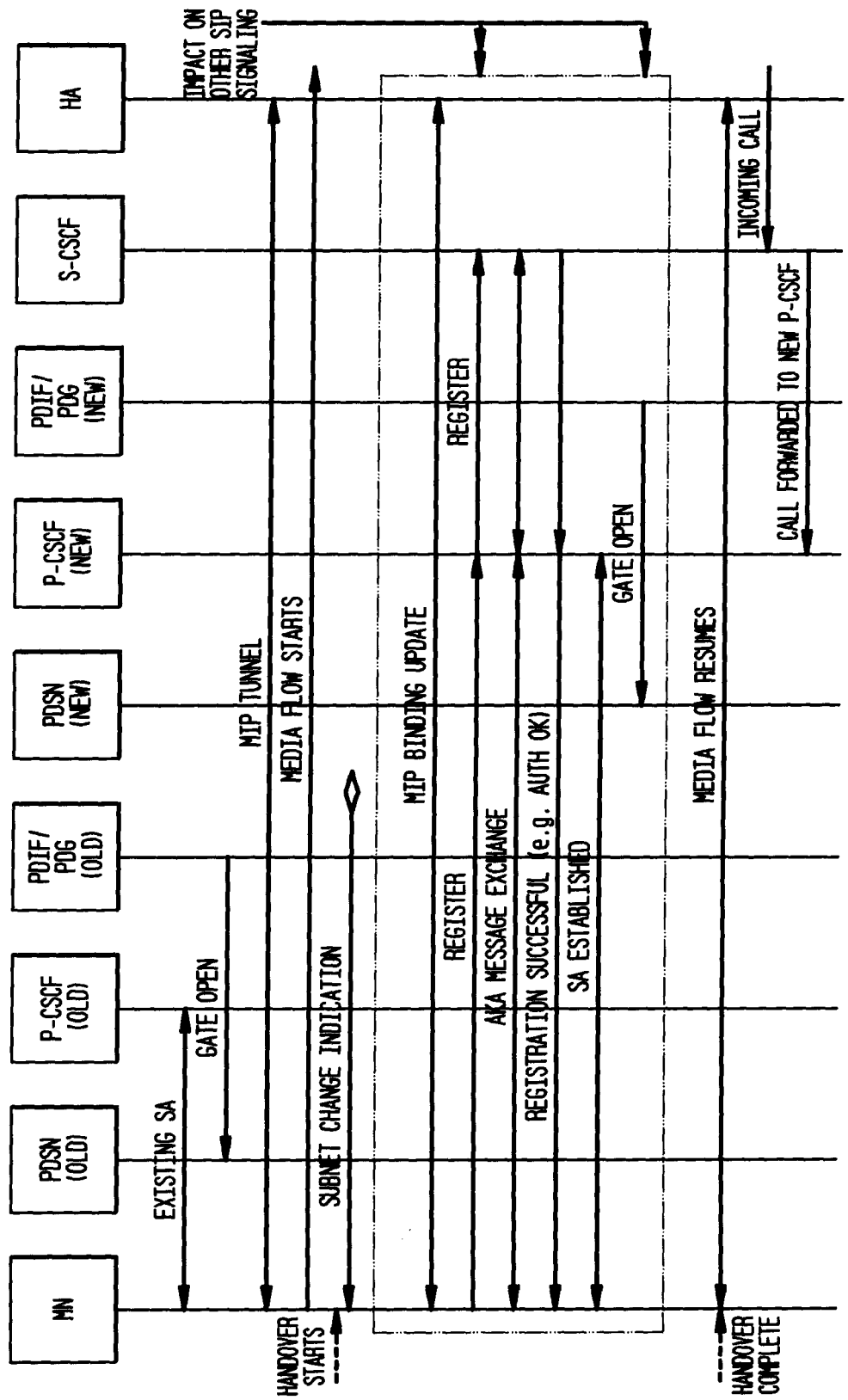
FIG. 1 illustrates Impact on Signaling without P-CSCF Fast Handoff.
Figure 2:
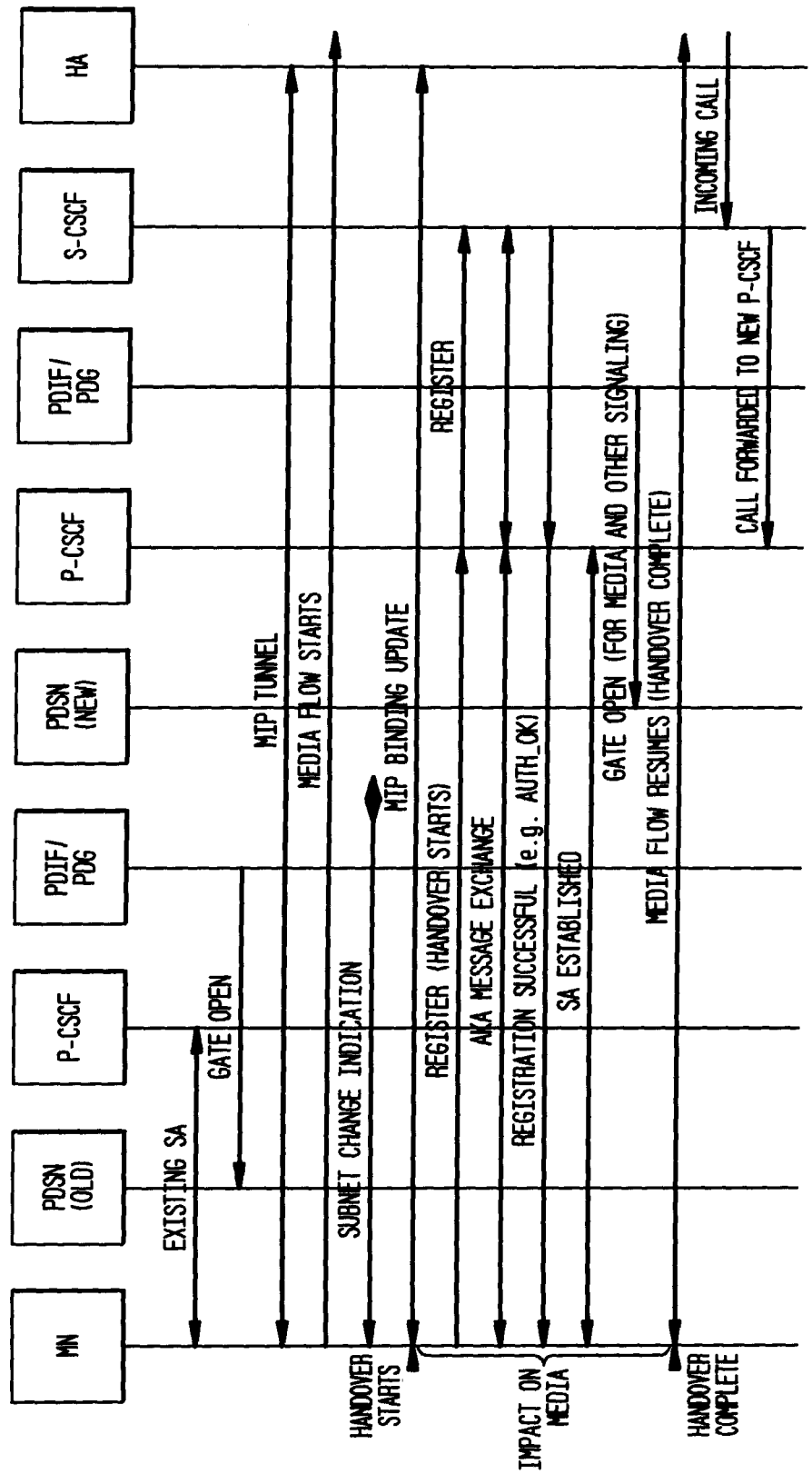
FIG. 2 illustrates Impact on Media without P-CSCF Fast Handoff.
Figure 3:
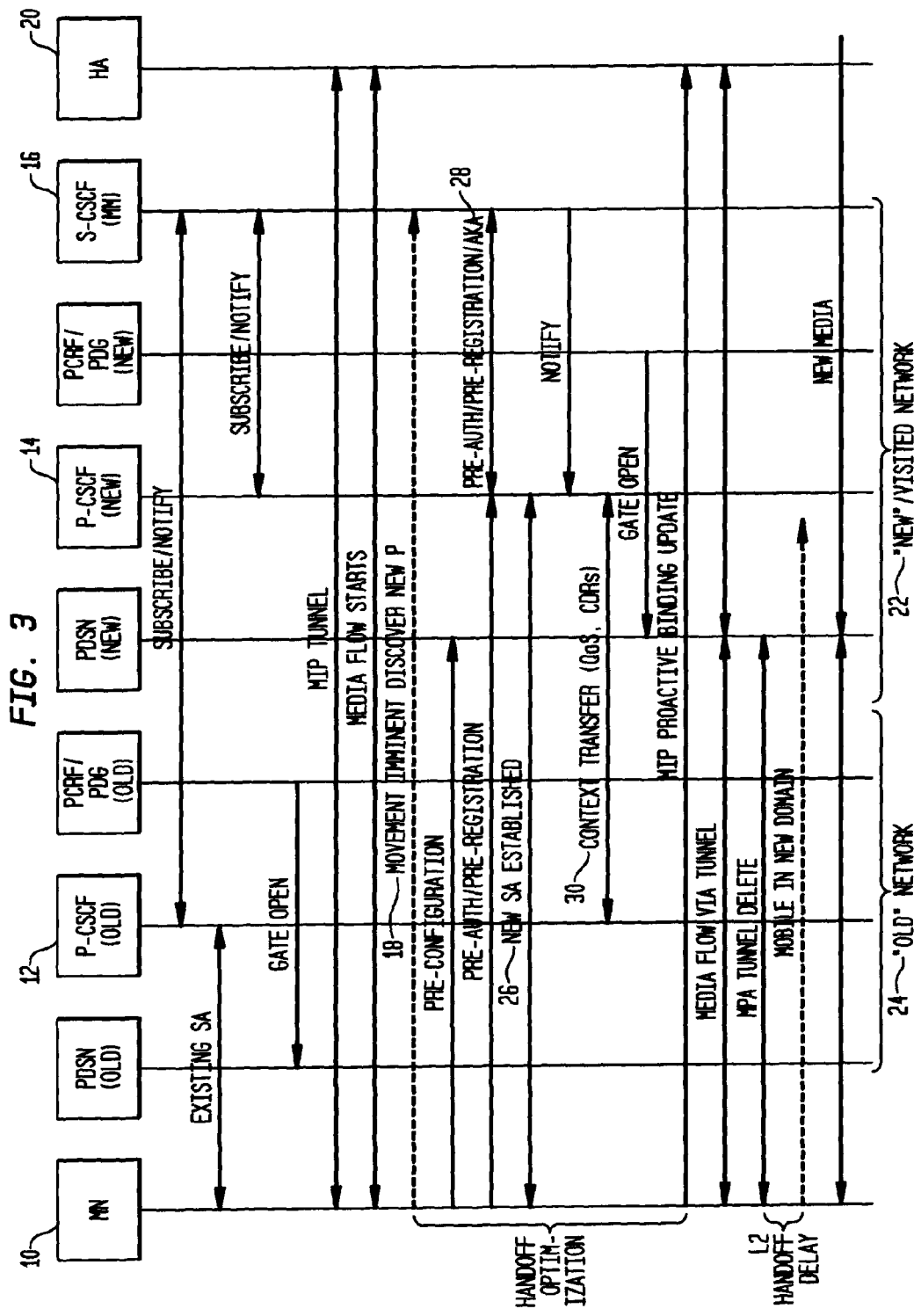
FIG. 3 illustrates MPA with MIPv4-FA assisted.

MPA with MIPv4 in IMS/MMD Architecture:

FIG. 3 shows the call flows illustrating the use of MPA for MIPv4 FA-assisted CoA. The key mechanism behind MPA is its pre-authentication and pre-registration procedure 28 that helps to establish the security association in advance, and reduces the media handoff delay that would otherwise occur after the handoff. The following are the events that occur before the handoff and after the handoff.

P-CSCF 12 subscribes to mobility event package with S-CSCF 16 (via SUBSCRIBE/NOTIFY) and vice versa. P-CSCF 12 also subscribes to mobility event package with Mobile Node 10 (via SUBSCRIBE).

When the mobile is in the old network 24, security association is in place as part of the initial AKA procedure and the gate is open. Thus there is a communication between Mobile Node 10 and CH via HA 20.

Mobile Node 10 receives some early indications for subnet change based on some policy decision, for example, indication that movement is imminent 18.

Mobile Node 10 uses a certain network discovery scheme to determine the neighboring network elements such as the new P-CSCF 14 and other authentication server.

As part of the pre-authentication procedure 28, Mobile Node 10 initiates a pre-registration procedure 28 with the S-CSCF 16 via new P-CSCF 14.

As a result of this procedure 28, the AKA is performed and the new P-CSCF 14 gets the key from S-CSCF 16 that is used to establish the security association 26 at new P-CSCF 14; at present, this would have taken place after the mobile has moved.

Similarly a new security association 26 is also created at Mobile Node 10 to secure the communication between Mobile Node 10 and new P-CSCF 14.

State transfer 30 from old P-CSCF 12 to new P-CSCF 14 can be performed based on the notification from S-CSCF 16.

At this point, gate is open in the new (visited) network 22, since both security association 26 and state transfer 30 have been complete.

Mobile IP update has not been done ahead of time here, thus all the registration messages would still go through FA1. MIP update, if performed before the mobile's movement to the new network 22, may result in a routing loop and is thus avoided before the handoff.

As the mobile moves to the new network 22, and listens to the FA2 advertisement, it triggers a new binding update, and MIP procedure is complete.

As soon as the MIP update is performed, new media can flow in the new network 22 without getting delayed by a factor of time that is usually required for AKA procedure and context state transfer.

Mobile Node 10 may choose to perform a re-registration with the S-CSCF 16 without affecting the already established security association 26 at new P-CSCF 14.

By indicating movement 18 and performing the MPA procedure 28 including the AKA procedure 28 ahead of time, Mobile Node 10 can benefit from the reduced packet loss that is limited to the time taken due to layer 2 handoff and binding update.

The effect of MPA on the new incoming calls when the mobile is in the old network 24 but is registered via new P2 may require further investigation but it is likely that any new call can also be transferred during the transient period, e.g., between the time mobile has done a registration via new P-CSCF 14 and has moved to the new or visited network 22.

Figure 4:
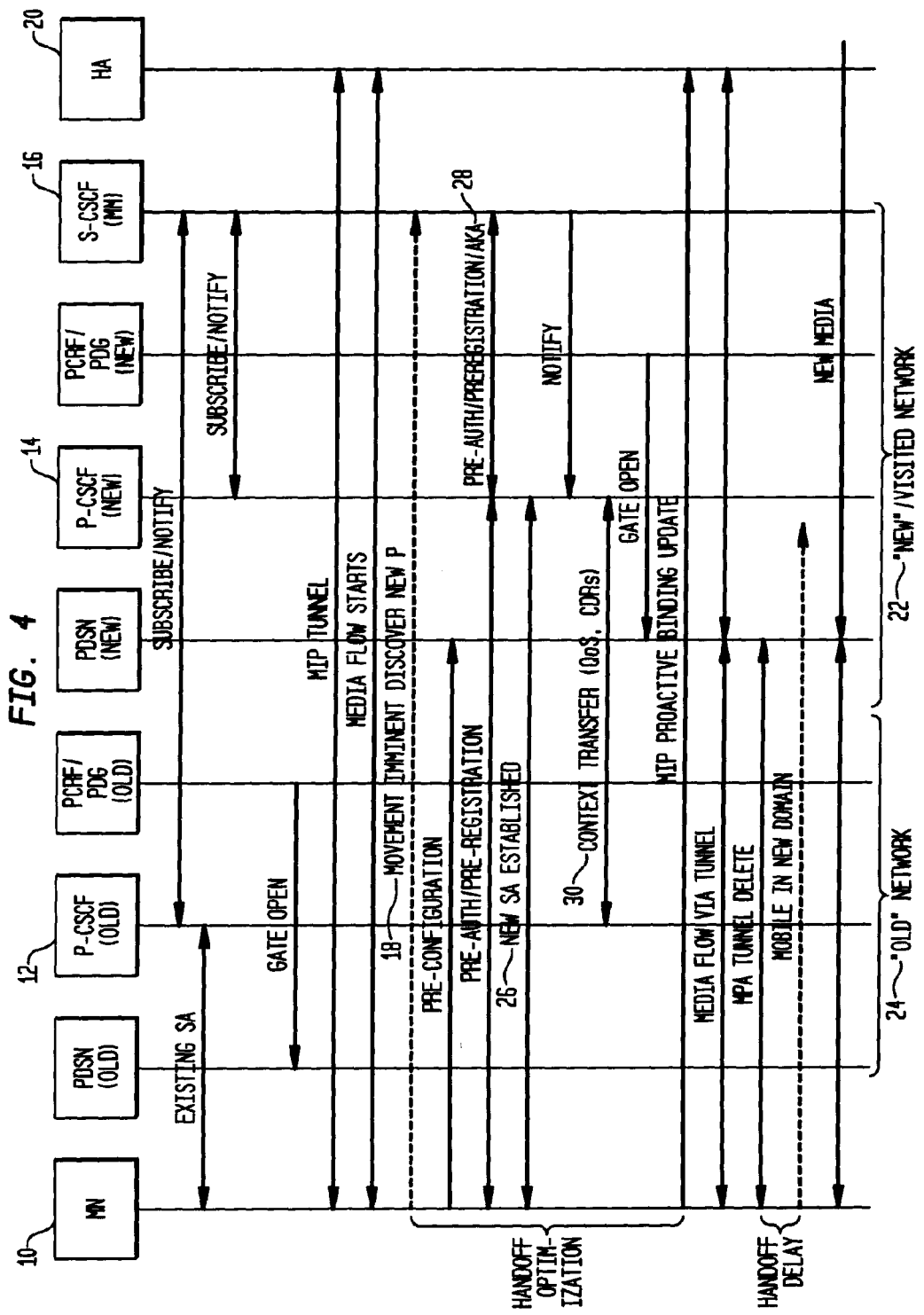
FIG. 4 illustrates MPA with IPv6.

In the call flows illustrated in FIGS. 3 and 4, MIP update is shown in the new network 22. However, it may be possible to send the MIP update in the previous (old) network 24, to avoid the delay due to binding update altogether.

MPA with MIPv6 in IMS/MMD Architecture:

MPA 28 used to provide fast-handoff in an MIPv6 network that may use MIPv6 CoA or SIP mobility is presented, and the call flow of MPA 28 that can be used with MIPv6 is described. Unlike MIPv4 with FA-CoA, there is no FA in MIPv6, and the mobile gets the new CoA upon every move. If SIP procedure is involved, it follows more or less the same steps as in MIPv4 case. However in the absence of FA, binding update can be sent proactively in addition to pre-registration, helping to complete the AKA procedure.

FIG. 4 illustrates the call flows or the sequence of operation that might happen during the handoff process.

P-CSCF 12 subscribes to mobility event package with S-CSCF 16 (via SUBSCRIBE/NOTIFY) and vice versa.

P-CSCF 12 also subscribes to mobility event package with Mobile Node 10 (via SUBSCRIBE).

When the mobile is in the old network 24, security association is in place as part of initial AKA procedure and the gate is open. Thus, there is a communication between Mobile Node 10 and CH via HA 20.

Mobile Node 10 receives some early indications for subnet change 18 based on some policy decision.

Mobile Node 10 uses a certain network discovery scheme to determine the neighboring network elements such as the new P-CSCF 14 and other authentication server.

As part of the pre-authentication procedure 28, Mobile Node 10 initiates a pre-registration procedure 28 with the S-CSCF 16 via new P-CSCF 14.

As a result of this procedure 28, the AKA is performed and the new P-CSCF 14 gets the SA key 32 from S-CSCF 16 that is used to establish the security association 26 at new P-CSCF 14; at present, this would have taken place after the mobile had moved.

Similarly a new security association 26 is also created at Mobile Node 10 to secure the communication between Mobile Node 10 and new P-CSCF 14.

At the same time, S-CSCF 16 can notify old P-CSCF 12 to start the context transfer 30 of QoS and pricing information from old P-CSCF 12 to new P-CSCF 14.

Once AKA procedure is done via new P-CSCF 14 and context transfer 30 is over, the gate opens up in the new network 22.

As part of the MPA procedure 28, the mobile has also obtained its new CoA while in the previous network 24.

Mobile Node 10 sends a proactive binding update thus allowing the media to flow through the new PDSN without bidirectional tunnels through HA 20.

At some point, based on a certain policy, the mobile decides to move to the new network 22 and changes its point of attachment.

Since the SA is already established 26, context transfer 30 is complete, the gate has already opened up and thus media flows through the new network 22.

The only delay introduced is the delay due to layer 2 handoff.

Network controlled means S-CSCF 16 control handover. The network elements are assumed to have the following capabilities:

Mobility event package is supported by the S-CSCF 16 and P-CSCFs.

A context transfer protocol (CXTP) is available between P-CSCFs.

SA can exist between P-CSCFs and between S-CSCF 16 and P-CSCF.

Two methods by which one can minimize the handoff delay for an IMS/MMD architecture, proactive handover and reactive handover, are presented.

Proactive Handover

Proactive CXTP Via P-CSCF (Push Model) Including SA Keys

Figure 5:
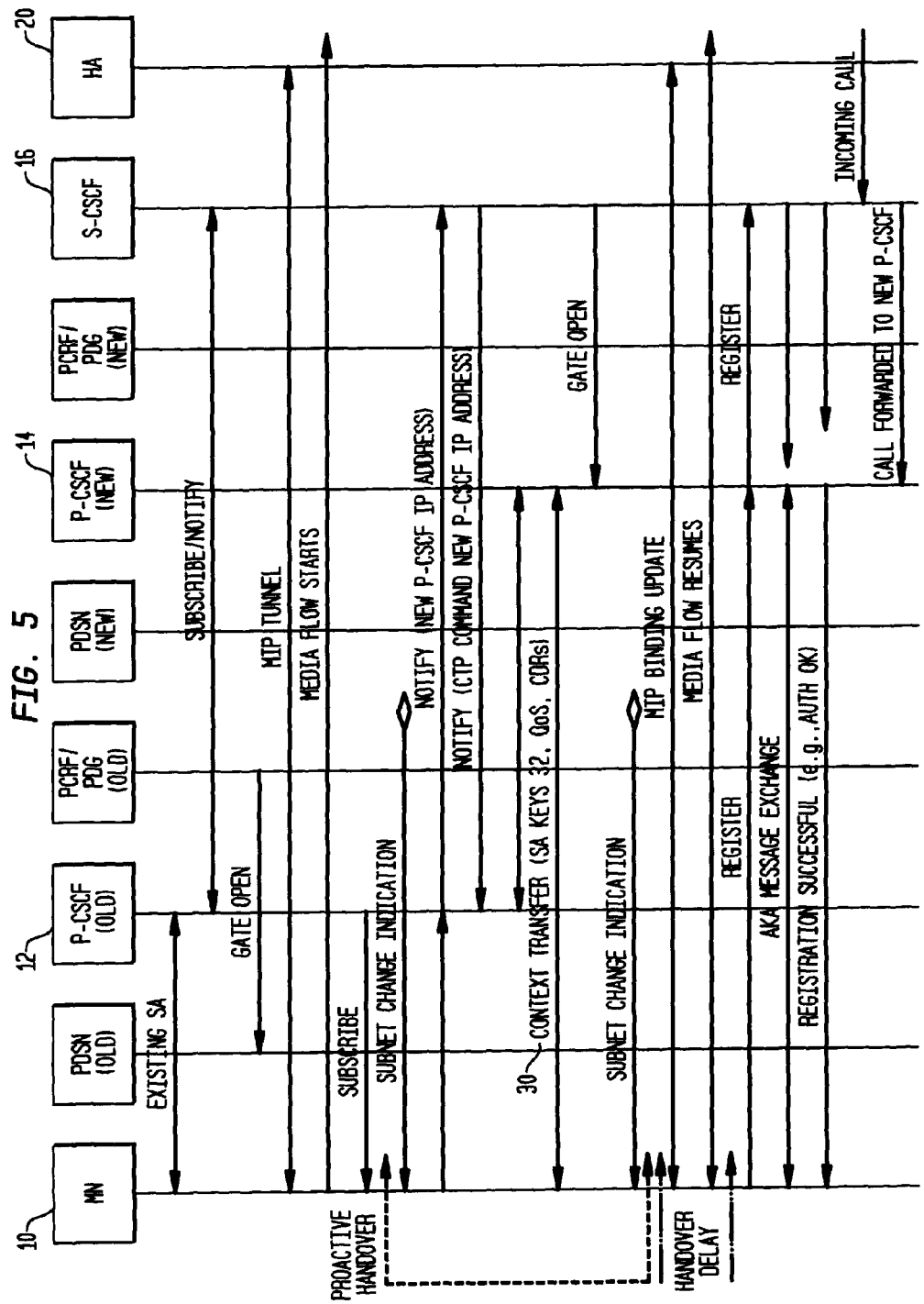
FIG. 5 illustrates Fast Handoff with CXTP via P-CSCF (Push Model) including SA Keys.

FIG. 5 depicts the call flows for a scenario where old P-CSCF 12 transfers call state information including SA keys 32 for a Mobile Node 10 to new P-CSCF 14 after receiving a command from S-CSCF 16. The call flow is as follows:

Before Handover:

P-CSCF 12 subscribes to mobility event package with S-CSCF 16 (via SUBSCRIBE/NOTIFY) and vice versa.

P-CSCF 12 also subscribes to mobility event package with Mobile Node 10 (via SUBSCRIBE).

Mobile Node 10 receives some early indications on subnet change.

Mobile Node 10 notifies the P-CSCF 12 of any impending or imminent movement 18 with target or new P-CSCF 14 address and old P-CSCF 12 forwards the target address to S-CSCF 16 (via NOTIFY).

S-CSCF 16 sends the new P-CSCF 14 address to old P-CSCF 12 (via NOTIFY).

Old P-CSCF 12 transfers call state information including Mobile Node 10 SA keys 32 to new P-CSCF 14.

New P-CSCF 14 establishes the SA 26 for Mobile Node 10 and the gate is open for Mobile Node 10 at the new PDSN.

Mobile Node 10 receives definite indication regarding handover and connects to new access link.

After Handover:

Mobile Node 10 sends MIP binding update to the HA 20 as the interface address changes.

Media flow resumes as soon as mobile receives the binding acknowledgement, and thereby handover completes.

Mobile Node 10 sends a SIP registration message as the interface address changes (REGISTER). New P-CSCF 14 forwards it to S-CSCF 16.

Mobile Node 10 and S-CSCF 16 also completes the registration process via normal AKA procedure.

All incoming calls are forwarded to new P-CSCF 14

Thus it is evident that handoff delay has been reduced significantly using proactive handover techniques. Both proactive and handover delay parts are indicated by dotted-line arrows in FIG. 5.

Proactive CXTP Via P-CSCF (Push Model) with Sa Keys Transferred Via S-CSCF

Figure 6:
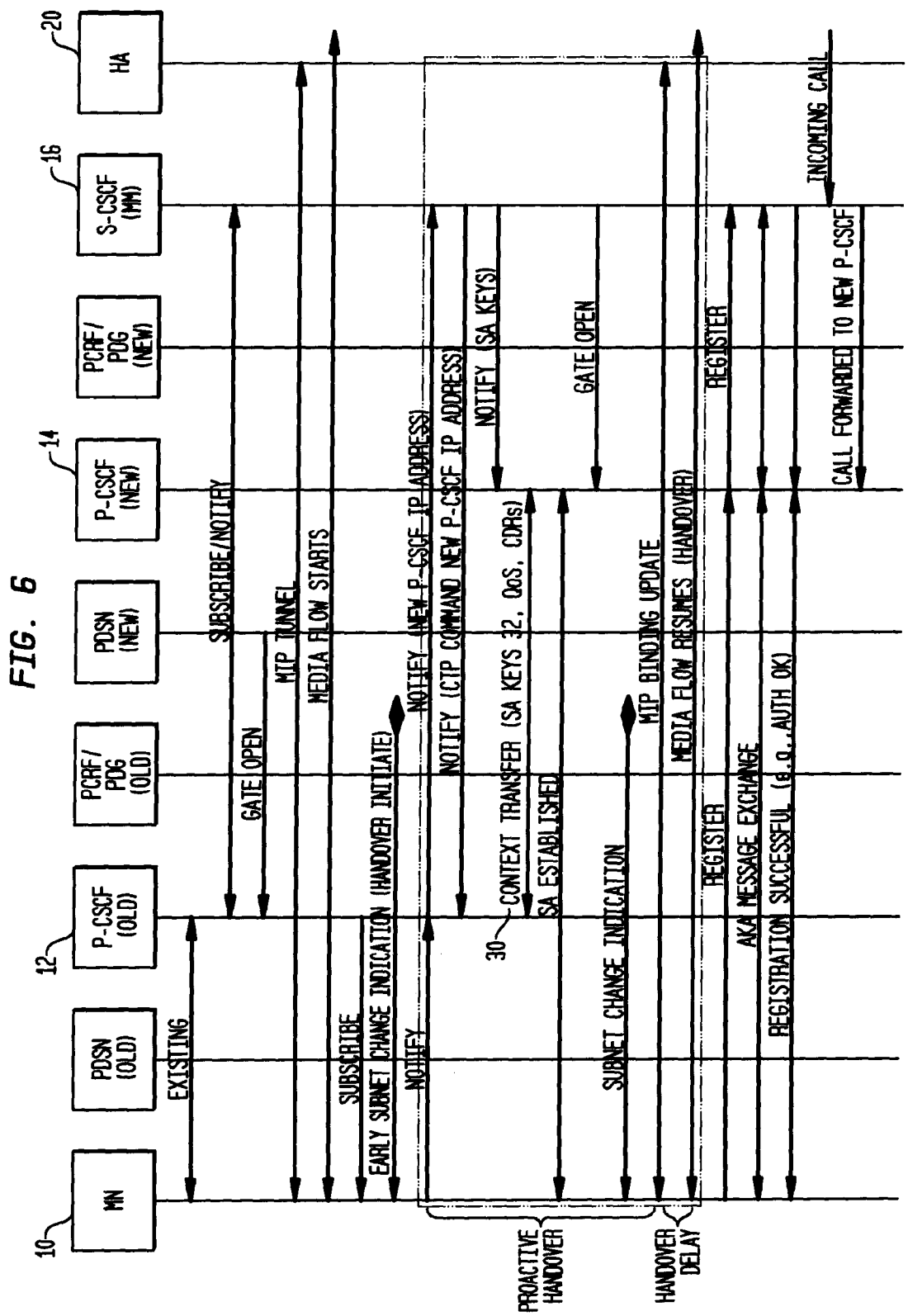
FIG. 6 illustrates Fast Handoff with CXTP via P-CSCF (Push Model) including SA Keys Transferred via S_CSCF.

FIG. 6 depicts the call flows for a scenario where old P-CSCF 12 transfers call state information, e.g., QoS and CDRs, and S-CSCF 16 transfers the key information, e.g. SA keys 32, to new P-CSCF 14. As with the prior scenario, the command for context transfer comes from S-CSCF 16. The only difference here is the key transfer. The call flow, before handover, is as follows. The call flow, after handover, is the same as above.

Before Handover:

Old P-CSCF 12 subscribes to mobility event package with S-CSCF 16 (via SUBSCRIBE/NOTIFY) and vice versa.

P-CSCF 12 also subscribes to mobility event package with Mobile Node 10 (via SUBSCRIBE).

Mobile Node 10 receives some early indications on subnet change.

Mobile Node 10 notifies the old P-CSCF 12 of any imminent movement 18 with new P-CSCF 14 address and old P-CSCF 12 forwards the new address to S-CSCF 16 (via NOTIFY).

S-CSCF 16 sends the new P-CSCF 14 address to old P-CSCF 12 (via NOTIFY).

S-CSCF 16 sends the SA keys 32 to new P-CSCF 14 (via NOTIFY).

New P-CSCF 14 establishes the SA 26 for Mobile Node 10 and the gate is open for Mobile Node 10 at the new PDSN.

Old P-CSCF 12 transfers call state information to new P-CSCF 14.

Mobile Node 10 receives a definite indication regarding handover and connects to new access link.

Reactive Handover

Reactive handover employs handover preparation as and when access link change happens. There are several components that constitute or cause the delay during reactive handover, and in general this delay is much higher than proactive handover. Accordingly, techniques to perform and to minimize handover delay are presented.

As defined earlier, network controlled means S-CSCF 16 control handover. It is also assumed, in the alternatives described below, that network elements have the following capabilities:

Mobility event package is supported by the S-CSCF 16 and P-CSCFs.

A CXTP is available between P-CSCFs.

SA can exist between P-CSCFs and between S-CSCF 16 and P-CSCF.

Reactive CXTP Via P-CSCF (Push Model) Including SA Keys

Figure 7:
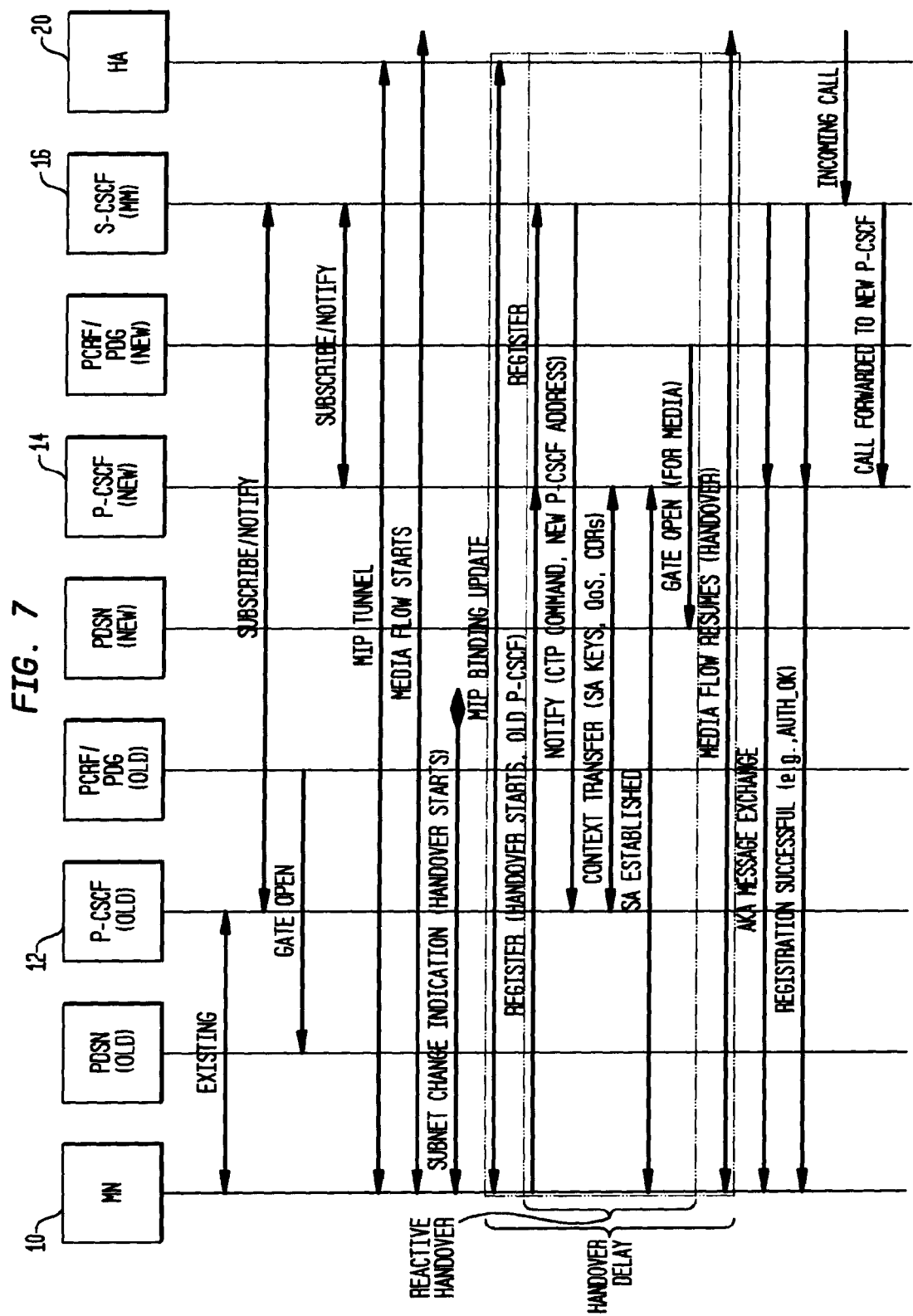
FIG. 7 illustrates Reactive Fast Handoff with CXTP via P-CSCF (Push Model) including SA Keys.

FIG. 7 depicts the call flows for a scenario where old P-CSCF 12 transfers call state information including SA keys 32 of a Mobile Node 10 to new P-CSCF 14 after receiving a command from S-CSCF 16. The call flow is as follows:

Before Handover:

Mobile Node 10 receives an indication regarding handover and connects to new access link, and thus handover happens.

After Handover:

Mobile Node 10 sends MIP binding update as the interface address changes.

Mobile Node 10 sends SIP registration to old P-CSCF 12, and P-CSCF 12 forwards it to S-CSCF 16 (via REGISTER).

S-CSCF 16 sends a CTP, e.g. command for CXTP, including the new P-CSCF 14 address to old P-CSCF 12.

Old P-CSCF 12 transfers the context 30 (push model) to new P-CSCF 14 including the SA keys 32.

Both Mobile Node 10 and new P-CSCF 14 establish SAs 26 between them and gate is open for media.

Media flow resumes.

Mobile Node 10 and S-CSCF 16 also completes the registration process via normal AKA procedure.

All incoming calls are forwarded to new P-CSCF 14:

The call flow shows that even with reactive handover, handoff delay can be reduced if the context transfer and corresponding security association can be established before the normal registration is complete. Both reactive handover steps and handoff delay are shaded in FIG. 7.

Reactive CXTP Via P-CSCF (Pull Model) Including SA Keys

Figure 8:
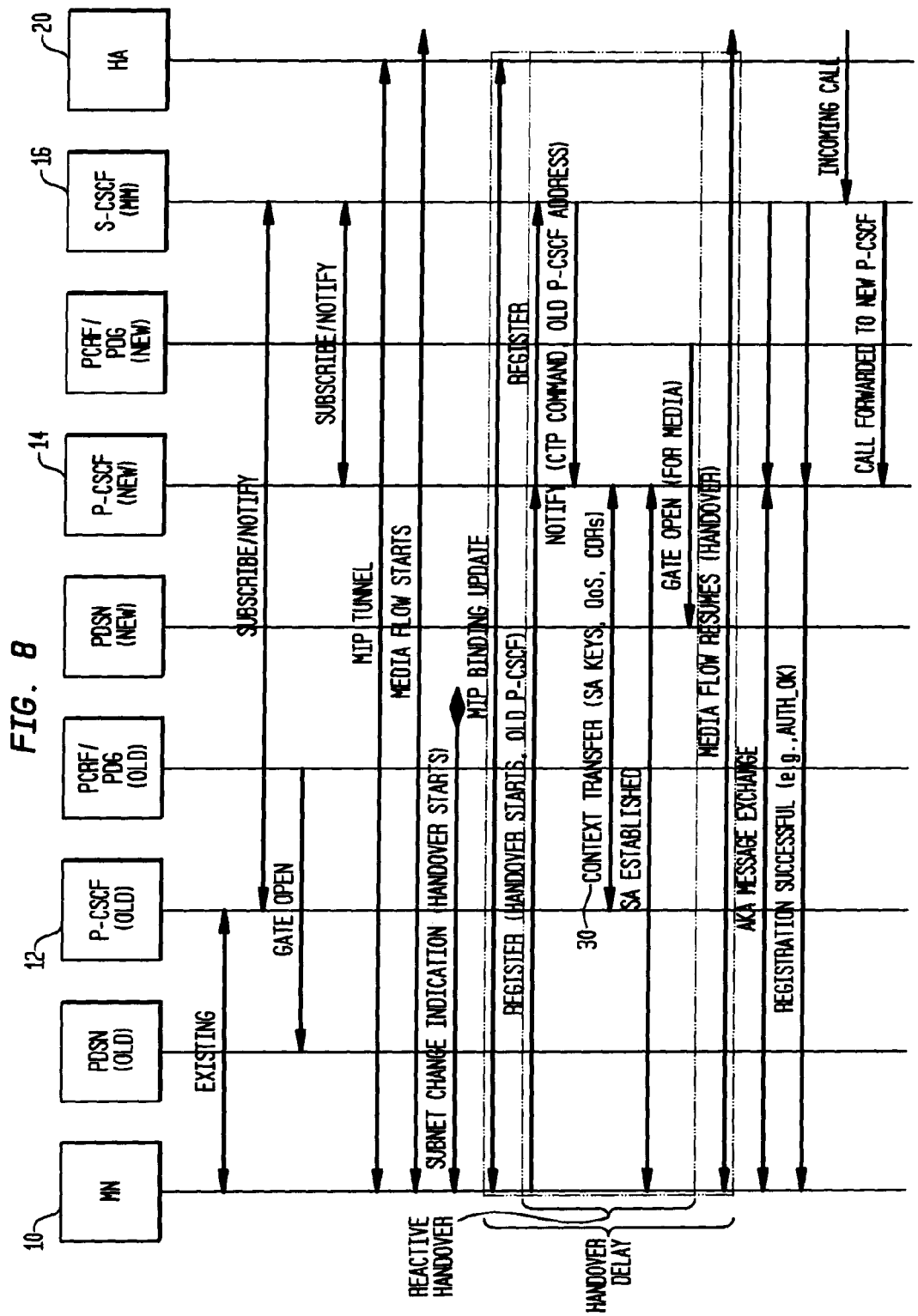
FIG. 8 illustrates Reactive Fast Handoff with CXTP via P-CSCF (Pull Model) including SA Keys.

FIG. 8 depicts the call flows for a scenario where new P-CSCF 14 fetches call state information including SA keys 32 of a Mobile Node 10 from old P-CSCF 12 after receiving a command from S-CSCF 16. The call flow before the handover is the same as for the above reactive push model; the call flow after the handover is as follows:

After Handover:

Mobile Node 10 sends MIP binding update as the interface address changes.

Mobile Node 10 sends SIP registration to old P-CSCF 12 and old P-CSCF 12 forwards it to S-CSCF 16 (via REGISTER).

S-CSCF 16 sends a CTP command including the old P-CSCF 12 address to new P-CSCF 14.

New P-CSCF 14 fetches the context 30 (pull model) from the old P-CSCF 12 including the SA keys 32.

Both Mobile Node 10 and new P-CSCF 14 establish SAs 26 between them and gate is open for media.

Media flow resumes.

Mobile Node 10 and S-CSCF 16 also completes the registration process via normal AKA procedure.

All incoming calls are forwarded to new P-CSCF 14.

Reactive CXTP Via P-CSCF (Push Model) Including SA Keys Transferred Via S-CSCF

Figure 9:
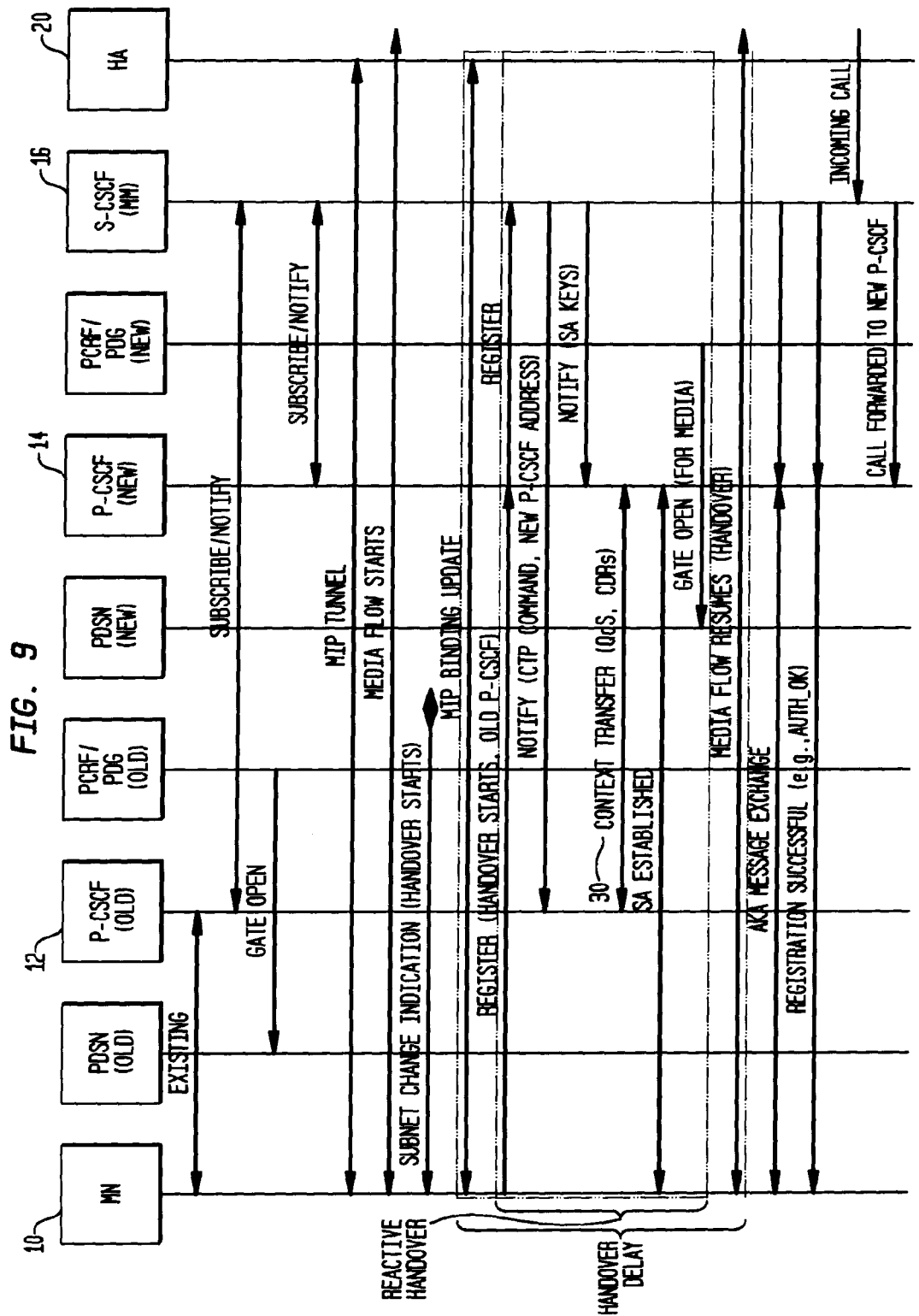
FIG. 9 illustrates Reactive Fast Handoff with CXTP via P-CSCF (Push Model) including SA Keys Transferred via S_CSCF.

FIG. 9 depicts the call flows for the scenario where old P-CSCF 12 transfers call state information, and S-CSCF 16 transfers the key information 32 to new P-CSCF 14. In this case, the command for context transfer comes from S-CSCF 16. The only difference here is the key transfer. The call flow before handover is the same as the other reactive embodiments, and the call flow after handover is as follows:

After Handover:
Mobile Node 10 sends MEP binding update as the interface address changes.
Mobile Node 10 sends SIP registration to old P-CSCF 12 and old P-CSCF 12 forwards it to S-CSCF 16 (via REGISTER).
S-CSCF 16 sends a CTP command including the new P-CSCF 14 address to old P-CSCF 12.
S-CSCF 16 sends the SA keys 32 to new P-CSCF 14.
New P-CSCF 14 establishes the SA 26 for Mobile Node 10 and the gate is open for Mobile Node 10 at the new PDSN.
Old P-CSCF 12 transfers the context (push model) 30, to the old P-CSCF 12.
Media flow resumes.
Mobile Node 10 and S-CSCF 16 also completes the registration process via normal AKA procedure.
All incoming calls are forwarded to new P-CSCF 14.

Reactive CXTP Via P-CSCF (Pull Model) Including SA Keys Transferred Via S-CSCF

Figure 10:
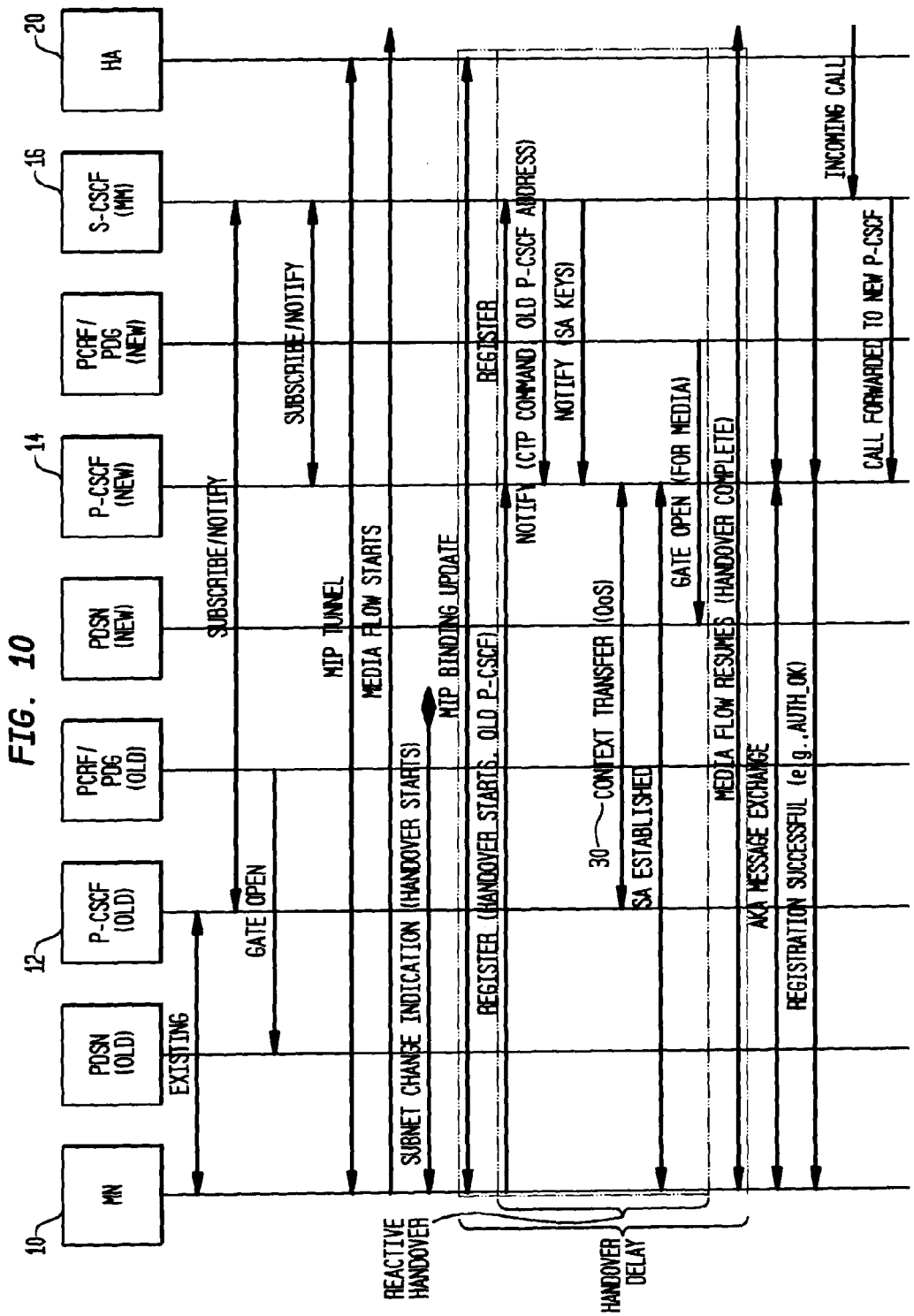
FIG. 10 illustrates Reactive Fast Handoff with CXTP via P-CSCF (Pull Model) including SA Keys Transferred via S_CSCF.

FIG. 10 depicts the call flows for the scenario where new P-CSCF 14 fetches call state information from old P-CSCF 12 and S-CSCF 16 transfers the key information 32 to new P-CSCF 14. The command for context transfer comes from S-CSCF 16 as in the other reactive embodiments. The only difference here is the key transfer. The call flow before handover is the same as the other reactive embodiments, and the call flow after handover is as follows:

After Handover:
Mobile Node 10 sends MIP binding update as the interface address changes.
Mobile Node 10 sends SIP registration to old P-CSCF 12 and old P-CSCF 12 forwards it to S-CSCF 16 (via REGISTER).
S-CSCF 16 sends a CTP command including the old P-CSCF 12 address to new P-CSCF 14.
S-CSCF 16 sends the SA keys 32 to new P-CSCF 14.
New P-CSCF 14 establishes the SA 26 for Mobile Node 10 and the gate is open for Mobile Node 10 at the new PDSN.
New P-CSCF 14 fetches the context 30 (pull model) from the old P-CSCF 12.
Both Mobile Node 10 and new P-CSCF 14 establish SAs 26 between them and gate is open for media.
Media flow resumes.
Mobile Node 10 and S-CSCF 16 also completes the registration process via normal AKA procedure.
All incoming calls are forwarded to new P-CSCF 14.

Fast Handoff

Fast Handoff with Bootstrapping

A simple scenario to demonstrate bootstrapping of IPSec SAs during the course of SIP registration in the IMS/MMD network is presented. A second scenario will demonstrate IPSec state transfer followed by rapid establishment of IPSec SAs during P-CSCF handoff. The latter scenario will also demonstrate the use of a context transfer mechanism involving both P-CSCFs and S-CSCF 16. Many of the optimization techniques can be realized using common SIP methods.

Fast-handoff Using Pre-registration (Pre-AKA) Approach

The security association in the target proxy can be set up ahead of time by performing proactive AKA. Using proactive AKA, the mobile can pre-register via the target P-CSCF even if the mobile is in the previous network. Using a network discovery mechanism, the mobile determines the first hop proxy (new P-CSCF 14) in the neighboring or visited network 22 and registers with home S-CSCF 16, but uses new P-CSCF 14 as the current outbound proxy. Since AKA process is established by virtue of registration process, a new security association is established with new P-CSCF 14. Since new security association is established, it helps to open the gate at the PDSN in the new network. This will avoid the delay associated with the AKA procedure and opening the gate.

However there are other issues such as maintaining dual registrations of outbound P-CSCFs 12, 14 at S-CSCF 16. It is important that the S-CSCF 16 can maintain simultaneous registrations for a small amount of time with the addresses of both P-CSCF 12 of the current network 24 and P-CSCF 14 of the new network 22. This will enable two different security associations to coexist on the mobile at the same time. There is a separate security association with each P-CSCF. As soon as the mobile moves to the new network 22, the old security association (security association between the mobile and P-CSCF in the previous network) is deleted, but the mobile still keeps the new security association that was established between mobile and new P-CSCF 14.

Figure 11:
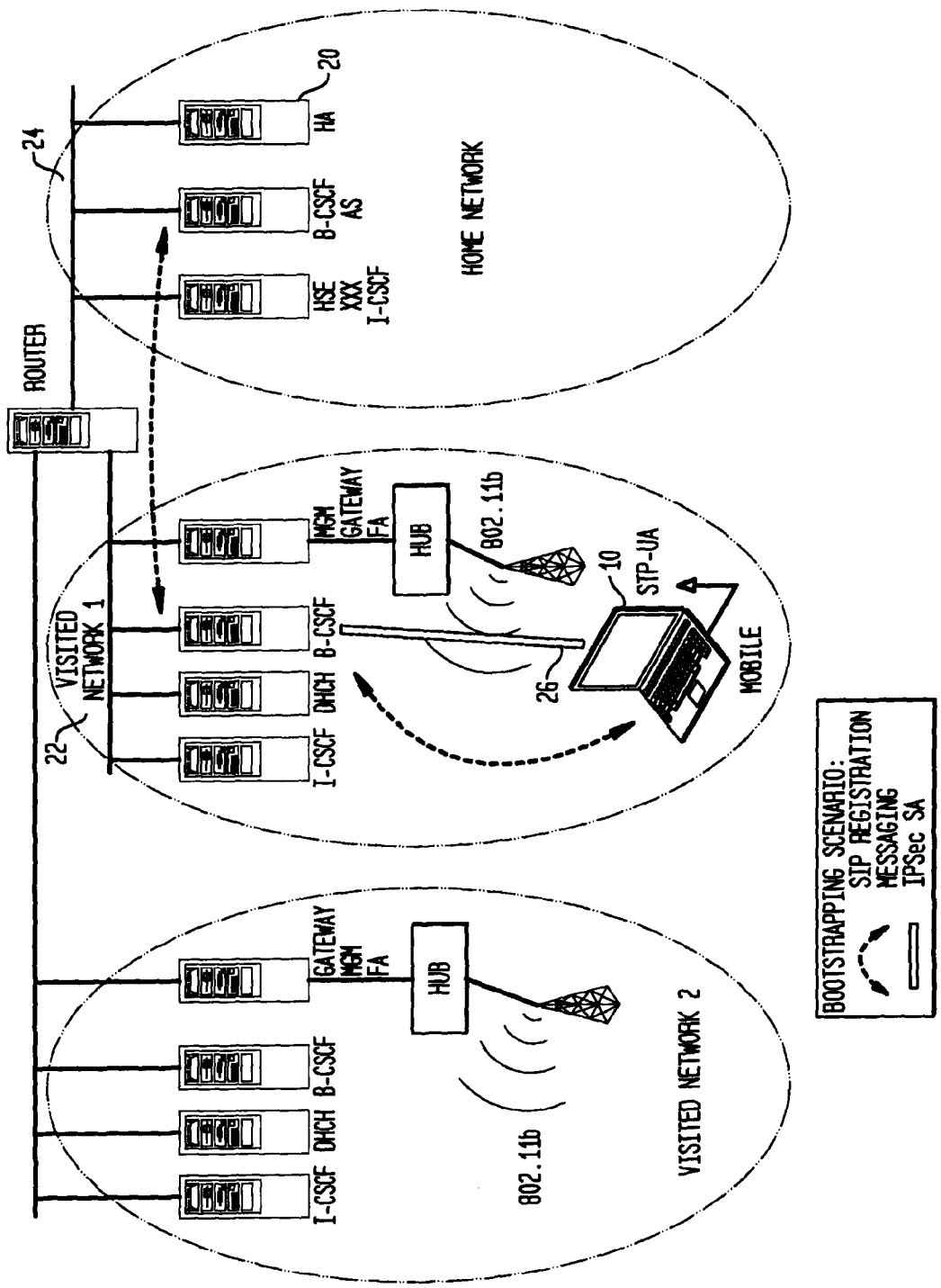
FIG. 11 illustrates Bootstrapping of IPSec SAs.

FIG. 11 shows a bootstrapping scenario in IMS/MMD architecture, and illustrates IPSec SA creation during initial registration. On boot up in the visited network 22, Mobile Node 10 performs the SIP registration procedure with the S-CSCF 16 via visited network 1's 22 P-CSCF 14. During the course of the SIP registration process, Mobile Node 10 also establishes an IPSec SA 26 with the P-CSCF 14.

Figure 12:
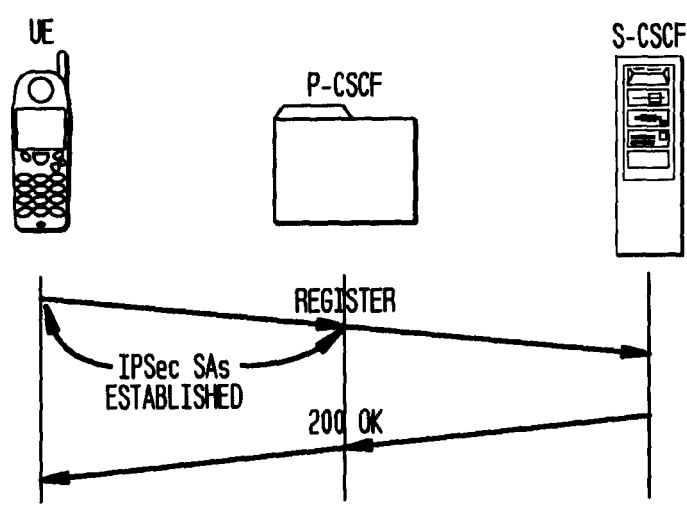
FIG. 12 illustrates Message Flow for IPSec SA Bootstrapping.

FIG. 12 illustrates message flows associated with a scenario where the IPSec SAs have not been established successfully. As a consequence, SIP registration will fail, which will be shown as registration failure.

Two alternative steps are presented to illustrate the above scenarios. In the first alternative, SA keys are preconfigured at the P-CSCF and Mobile Node 10, and these SA keys trigger the creation of IPSec SAs via the SIP Registration process. SA creation failure could be demonstrated by intentionally misconfiguring keys at the P-CSCF. In the second alternative, the keys are transferred from the S-CSCF 16 to the P-CSCF as part of the SIP Registration procedure.

Figure 13:
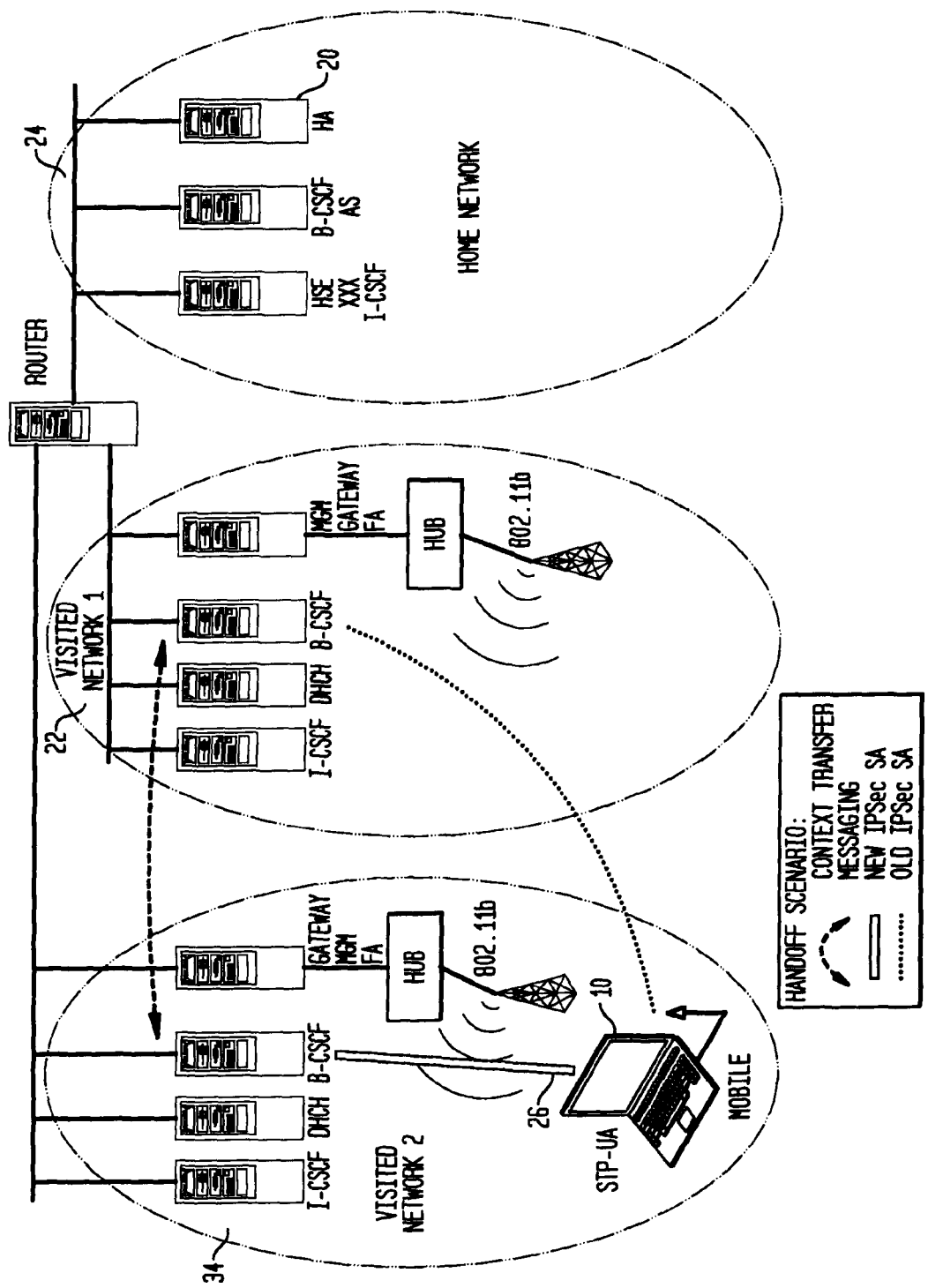
FIG. 13 illustrates Optimized IPSec Handoff Scenario.
Figure 14:
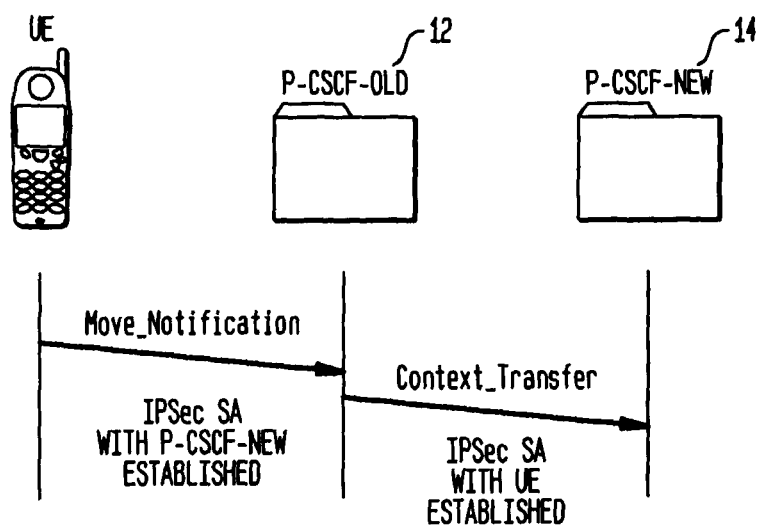
FIG. 14 illustrates Optimized IPSec Handoff Call Flow.

FIG. 13 shows the optimized handoff scenario for IPSec SAs. In this case, the UE will move from visited network 1 22 to visited network 2 34. The UE's context information, e.g. IPSec SA keys 32, will be transferred from the old P-CSCF 12, e.g. visited network 1 22, to the new P-CSCF 14, e.g. visited network 2 34, well in advance so that the establishment of SAs 26 at the new P-CSCF 14 can happen before Mobile Node 10 physically moves to visited network 2 34. This will be achieved by obtaining a movement indication message from the UE before Mobile Node 10 moves to network 2 34. In addition, the UE or Mobile Node 10 will also establish SAs 26 with the new P-CSCF 14 prior to moving to network 2 34. The message flows associated with this scenario are shown in FIG. 14.

In one embodiment of the optimized handoff scenarios described above, the keys 32 are transferred from the old P-CSCF 12 to the new P-CSCF 14 using a simple CXTP implementation over TCP/UDP.

In another embodiment, the keys 32 are transferred from S-CSCF 16 to P-CSCF 14. Sending a notification from the old P-CSCF 12 to the S-CSCF 16 indicating UE's intention to move would cause S-CSCF 16 to pro-actively transfer the keys 32 to the new P-CSCF 14.

In one embodiment, movement indication will be provided by the UE and the address of the new P-CSCF 14 will be hard coded at the UE, and transferred to the old P-CSCF 12 as part of the move notification. Any mechanism to predict the next P-CSCF 14 can be used.

Implementation details of an embodiment of the security optimization that has been carried out in the IMS/MMS architecture are presented, including the complete architecture of the software agents associated with Mobile Node 10, P-CSCF 12, 14, and S-CSCF 16. These agent architectures illustrate the basic functionalities of the software modules installed in each of these functional components. The proof-of-concept of some of the security optimization techniques using software agents that use XML over TCP has been completed. In reality, S-CSCF 16 and P-CSCF 12, 14 can be enhanced to provide these techniques using several SIP methods such as SUBSCRIBE, NOTIFY, MESSAGE. These methods can carry similar XML messages in the body to do the context transfer 30 between P-CSCFs 12, 14 and between S-CSCF 16 and P-CSCF 12.

FIGS. 15*a*, 15*b* and 15*c* show implementation steps for three different scenarios: a) bootstrapping, b) context generation, and c) mobility, illustrating the interaction between different functional modules or entities, such as Mobile Node 10, P-CSCFs 12, 14 and S-CSCF 16. Each of these entities has agents that interact with each other to provide the desired functionality. The details of these agents, and different messages these agents can send and receive, are described below.

The behavior of the mobile and function of the agent on the mobile is described. In the proof-of-concept implementation, the mobile agent is pre-provisioned with a sequence of keys that may be used for setting up SAs with various P-CSCFs. In practice, a single key would be pre-provisioned at the mobile, and SA keys would be generated by applying appropriate functions on this single key in conjunction with random numbers from the P-CSCF (as part of AKA).

On startup, Mobile Node 10 snoops for an outgoing registration message. When this message is detected, Mobile Node 10 sets up an SA with the current P-CSCF 12 using the first key in its pre-provisioned list. When movement to a different P-CSCF 14 becomes imminent, Mobile Node 10 sends an XML encoded MoveNotify message to its current P-CSCF 12. The only parameter carried by this message is the IP address of next P-CSCF 14 to which this Mobile Node 10 expects to move. The mechanism by which Mobile Node 10 is able to infer the identity of the next P-CSCF 14 is out of the scope of this implementation. After sending the MoveNotify message, Mobile Node 10 uses the next key in its list to establish an SA 26 with the next P-CSCF 14.

The agent architecture for P-CSCF, and how the P-CSCF handles different messages, is as follows. The P-CSCF agent runs in two Java threads. A "snooper" thread snoops for REGISTRATION and INVITE message from Mobile Node 10. On detection of a Registration message from Mobile Node 10, it sends a GetKey message to the S-CSCF 16 with a single parameter: Mobile Node 10's IP. The GetKey message is a request to obtain the current key from the S-CSCF 16 defined for this specific mobile. On detection of an INVITE message, the P-CSCF agent generates a local context record for Mobile Node 10 as shown in FIGS. 15*a*), *b*), and *c*).

The P-CSCF agent also runs a thread that listens for several messages. On receiving a MoveNotify from Mobile Node 10, the agent sends a corresponding MoveNotify to the S-CSCF 16 with the addresses of the next PCSCF 14 and Mobile Node 10 as parameters. This message also triggers the context transfer procedures 30 at the S-CSCF 16. This agent also listens for the KeyMsg message from the S-CSCF 16 that contains the keying information for a specific mobile node and establishes an SA 26 with Mobile Node upon receipt. The agent also listens for a Context Transfer message from a previous P-CSCF 12 containing the IP address of Mobile Node 10 whose context is being transferred along with the actual context information being transferred. The agent sets up the local context for Mobile Node 10 using the received context information. The agent also listens for a Do Context Transfer message from the S-CSCF 16 carrying the address of Mobile Node 10 whose context needs to be transferred, and the address of the P-CSCF 14 to which the context needs to be transferred. The agent executes the actual context transfer 30 to new P-CSCF 14 by using the Context Transfer message described above.

S-CSCF 16 agent listens for GetKey and MoveNotify messages from P-CSCFs in visited networks. The GetKey message contains the IP address of a Mobile Node 10 as a parameter and triggers a key lookup for that Mobile Node 10. Once the lookup is completed, the agent sends a KeyMsg to the requesting P-CSCF with the keying data and Mobile Node's IP address as parameters. The MoveNotify message contains the address of Mobile Node 10 intending to change P-CSCFs as well as the address of the next P-CSCF 14 to which Mobile Node 10 plans to move. The agent then looks up current key for Mobile Node 10 and sends a KeyMsg to the next P-CSCF 14 containing the keying information and the IP address of Mobile Node 10 as parameters. The agent then sends a Do Context Transfer message to Mobile Node's current P-CSCF 12, with the IP addresses of Mobile Node 10 and the next P-CSCF 14 to which Mobile Node 10 plans to move.

All the messages discussed in this section are transmitted as XML encoded text over TCP in the proof-of-concept implementation. These messages can be embedded into SIP payloads for the purpose of integrating the agent functionality into the actual P-CSCF 12, 14, S-CSCF 16 and Mobile User Agent entities. However, other message techniques known in the art can be used.

Figure 16:
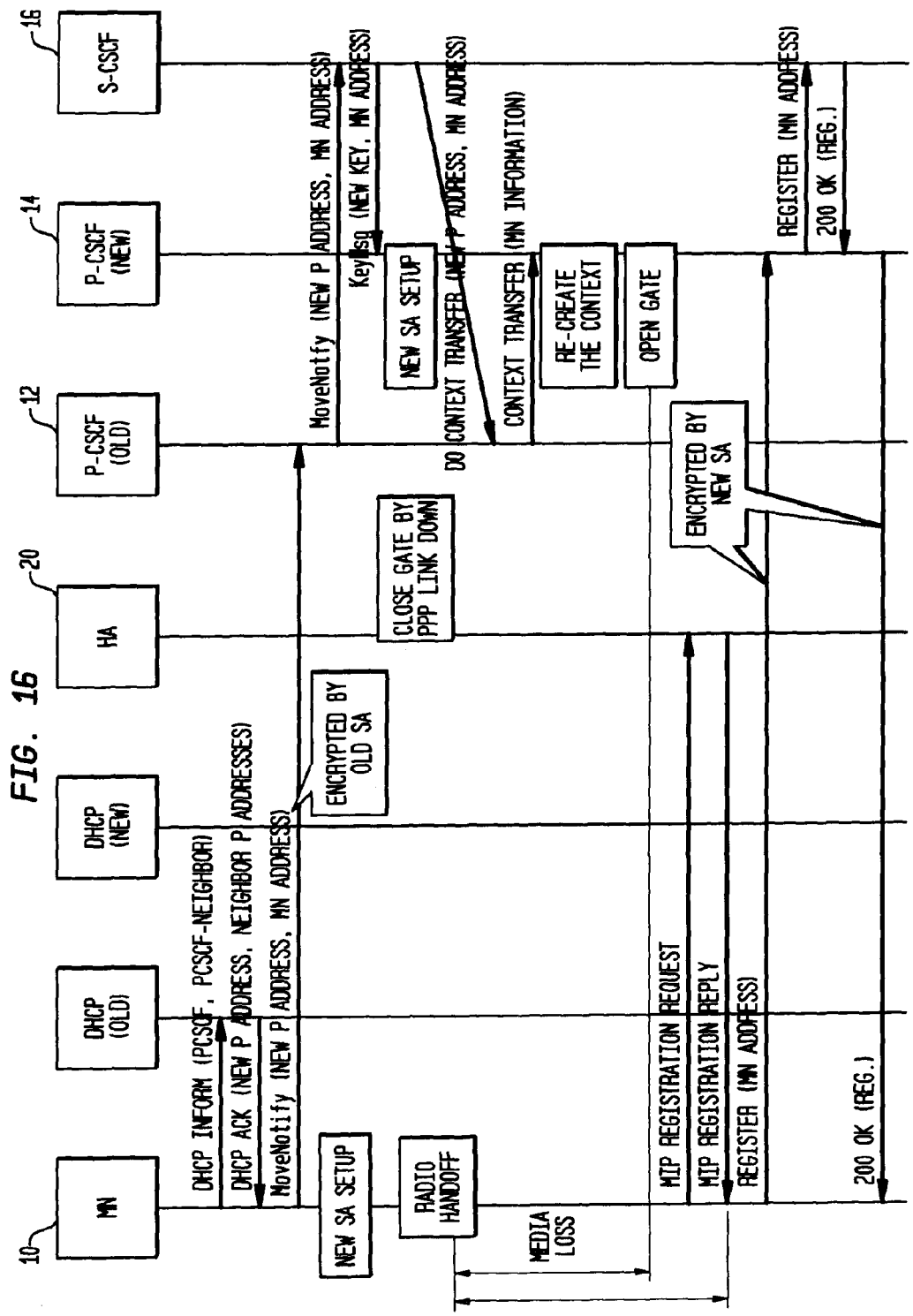
FIG. 16 illustrates an example of proactive handoff implementation.

FIG. 16 shows another proactive handoff scenario that has been implemented in the current IMS/MMD architecture. This actually emulates the some of the functions that are performed by AKA. This way, the packet loss due to handoff is limited to MIP delay and layer 2 handoff delay only.

While the present invention has been described in particular embodiments, it should be appreciated that the present invention should not be construed as limited by such embodiments, but rather construed according to the below claims.

What is claimed is:

1. A method for handoff in IMS/MMD architecture of a mobile node in a first network, said mobile node associated with a first protocol component in said first network, said first protocol component associated with a second protocol component in said first network, said mobile node moving from said first network to a second network, said method comprising:

preparing to move said mobile node to said second network by transferring context information from said first protocol component to a third protocol component in said second network while said mobile node is in said first network; and establishing a security association between said mobile node and said third protocol component using said context information while said mobile node is in said first network, thereby reducing handoff delay and packet loss for said mobile node.

2. A method for handoff in IMS/MMD architecture of a mobile node in a first network, said mobile node associated with a first protocol component in said first network, said first protocol component associated with a second protocol component in said first network, said mobile node moving from said first network to a second network, said method comprising:

transferring context information from said first protocol component to a third protocol component in said second network before said mobile node registers in said second network; and establishing a security association between said mobile node and said third protocol component using said context information before said mobile node registers in said second network, thereby reducing handoff delay and packet loss for said mobile node.

3. The method according to claim 2, wherein said transferring step occurs in response to a fetch from the third protocol component.

4. A system for handoff in IMS/MMD architecture, comprising:
- a mobile node in a first network;
- a first protocol component in said first network, said first protocol component associated with said mobile node, said first protocol component having context information;
- a second protocol component in said first network, said second protocol component associated with said first protocol component; and
- a second network having a third protocol component having an address, wherein while said mobile node is in said first network, a security association is created between said mobile node and said third protocol component in said second network, and said context information is transferred from said first protocol component to said third protocol component, thereby reducing handoff delay and packet loss for said mobile node.

5. A system for handoff in IMS/MMD architecture, comprising:
- a mobile node in a first network;
- a first protocol component in said first network, said first protocol component associated with said mobile node, said first protocol component having context information;
- a second protocol component in said first network, said second protocol component associated with said first protocol component; and
- a second network having a third protocol component having an address, wherein before said mobile node is registered in said second network, said context information is transferred from said first protocol component to said third protocol component and a security association is created between said mobile node and said third protocol component, thereby reducing handoff delay and packet loss for said mobile node.

* * * * *

UNITED STATES PATENT AND TRADEMARK OFFICE
CERTIFICATE OF CORRECTION

| | | |
|---|---|---|
| PATENT NO. | : 8,971,291 B2 | Page 1 of 1 |
| APPLICATION NO. | : 13/323317 | |
| DATED | : March 3, 2015 | |
| INVENTOR(S) | : Dutta et al. | |

It is certified that error appears in the above-identified patent and that said Letters Patent is hereby corrected as shown below:

Specification

In Column 1, Line 8, delete "2007." and insert -- 2007, now Pat. No. 8,098,627. --, therefor.

In Column 3, Line 6, delete "DS:" and insert -- PDS: --, therefor.

In Column 8, Line 32, delete "14:" and insert -- 14. --, therefor.

In Column 9, Line 4, delete "MEP" and insert -- MIP --, therefor.

Signed and Sealed this
Sixth Day of October, 2015

Michelle K. Lee
*Director of the United States Patent and Trademark Office*